United States Patent
Matsui et al.

(10) Patent No.: US 7,221,661 B2
(45) Date of Patent: May 22, 2007

(54) RADIO TERMINAL, RADIO SYNCHRONIZATION SYSTEM HAVING NO BASE STATION, AND RECORDING MEDIUM

(75) Inventors: Masaki Matsui, Chuo-ku (JP); Eiji Shinsho, Chuo-ku (JP); Minoru Ogino, Chuo-ku (JP); Shigeo Sato, Chuo-ku (JP)

(73) Assignee: Uniden Corporation, Tokyo (JP)

( * ) Notice: Subject to any disclaimer, the term of this patent is extended or adjusted under 35 U.S.C. 154(b) by 1140 days.

(21) Appl. No.: 10/209,908

(22) Filed: Aug. 2, 2002

(65) Prior Publication Data
US 2003/0086387 A1 May 8, 2003

(30) Foreign Application Priority Data
Nov. 5, 2001 (JP) ............................. 2001-339384

(51) Int. Cl.
H04B 7/212 (2006.01)
(52) U.S. Cl. ...................... 370/324; 370/350; 370/503; 370/510; 370/512
(58) Field of Classification Search ........ 370/328–338, 370/350, 503, 509–512, 513, 514, 311–312, 370/278, 324, 345–347, 465; 340/825.2; 375/362–366, 368, 240.28; 348/500, 512, 348/518; 455/515, 500, 68, 574
See application file for complete search history.

(56) References Cited

U.S. PATENT DOCUMENTS

| | | | | |
|---|---|---|---|---|
| 6,480,483 B2* | 11/2002 | Yahata et al. | ................ | 370/350 |
| 6,639,905 B1* | 10/2003 | Muller et al. | ................ | 370/336 |
| 6,680,918 B1* | 1/2004 | Haley | .......................... | 370/282 |
| 6,728,231 B1* | 4/2004 | Sugaya et al. | ............... | 370/336 |
| 6,876,643 B1* | 4/2005 | Aggarwal et al. | .......... | 370/338 |
| 6,959,013 B1* | 10/2005 | Muller et al. | ................ | 370/512 |
| 2004/0203382 A1* | 10/2004 | Park | .......................... | 455/41.2 |

FOREIGN PATENT DOCUMENTS

| | | |
|---|---|---|
| JP | A 1-106641 | 4/1989 |
| JP | A 4-273635 | 9/1992 |
| JP | A 6-282795 | 10/1994 |
| JP | A 6-318967 | 11/1994 |
| JP | A 7-212292 | 8/1995 |
| JP | A 7-336370 | 12/1995 |

(Continued)

Primary Examiner—Huy D. Vu
Assistant Examiner—Ho Chuong
(74) Attorney, Agent, or Firm—Oliff & Berridge, PLC

(57) ABSTRACT

According to the present invention, all terminals can establish synchronization in a radio communications system formed only of a plurality of mobile terminals. This radio terminal communicates by the time division connection method, and comprises a control portion for synchronizing its transmission/reception timing to that of a group including a plurality of radio terminals. The control portion determines the overall cycle including basic cycles in a number corresponding to the number of radio terminals within said group, conducts control to transmit a signal in a basic cycle that is included in said overall cycle and that is set by a unique terminal number allotted in advance to each of said radio terminals, conducts control to receive signals from another radio terminal in another basic cycle, adjusts the transmission/reception timing based on the data received from said other radio terminal in said other basic cycle, and saves the reception timing until a process to adjust the transmission/reception timing is conducted.

1 Claim, 7 Drawing Sheets

FOREIGN PATENT DOCUMENTS

| | | |
|---|---|---|
| JP | B2 2878123 | 1/1996 |
| JP | B2 3007797 | 2/1996 |
| JP | A 9-121382 | 5/1997 |
| JP | A 10-51376 | 2/1998 |
| JP | B2 2924828 | 5/1998 |
| JP | A 10-210553 | 8/1998 |
| JP | A 2000-13275 | 1/2000 |
| JP | B2 3114705 | 2/2000 |
| JP | A 2000-165930 | 6/2000 |
| JP | A 2001-118191 | 4/2001 |

* cited by examiner

FIG. 7

SCAN OPERATION EVENT

| RX_P1 | RX OFF | RX_C | RX OFF | RX_P2 | RX_C | RX OFF | RX_P3 |

SCAN TERMINAL

| RX OFF | RX_P2 | RX OFF | RX_C | RX OFF | RX_P3 | RX_C | TX_C | RX OFF | RX_P1 |

OTHER TERMINAL

FIG. 8

FRAME STRUCTURE OF TRANSMISSION DATA DURING INTERMITTENT OPERATION (UPPER FRAME)

| COMMAND CODE | OWN TERMINAL ID | GPS DATA | GPS DATA | GROUP DATA | SUM |

RADIO TERMINAL, RADIO SYNCHRONIZATION SYSTEM HAVING NO BASE STATION, AND RECORDING MEDIUM

BACKGROUND OF THE INVENTION

1. Field of the Invention

The present invention relates to a radio terminal that utilizes an intermittent transmission-reception method, a radio synchronization system that has no base station and that is applied to a telecommunications system including a plurality of such radio terminals, and a medium recording the program therefor.

2. Description of the Related Art

Japanese Patent Laid-Open Hei 10(1998)-51376 discloses a synchronization system and method for synchronizing the transmission timing of a plurality of mobile stations to that of a telecommunications system. According to this prior art, a mobile station can be synchronized to a telecommunications system without receiving any synchronization control from a fixed station. Specifically, a mobile station attempting to participate in a telecommunications network detects with its monitor portion the cycle of a slot in use located before the slot used by itself. Thereafter, using the detected cycle, the control portion of the mobile station calculates the deviation Δt of the transmission timing of itself from the slot timing of the telecommunications network. Thereafter, control portion 19 of the mobile terminal adjusts the transmission timing of itself by deviation Δt, thereby synchronizing itself to the telecommunications network.

The system according to the prior art above has the following characteristics.

(1) A method is provided of how a terminal participates in a network where quasi-synchronization is established;

(2) The prior art does not directly receive synchronization control from a fixed station, but detects the timing from a terminal participating in the network, so it indirectly uses the timing from a fixed station. Therefore, the system according to the prior art above requires a reference station for the timing.

(3) The prior art determines the access timing of itself by searching for an unused slot.

As the prior art above indirectly uses the timing from a fixed station, it cannot be applied to a radio communications system structured only of a plurality of mobile terminals.

The present invention aims at solving such problem by providing a radio terminal, a radio synchronization system and a medium recording a program therefor, used in a radio communications system formed only of a plurality of mobile terminals, that allows synchronization between all terminals.

SUMMARY OF THE INVENTION

The radio terminal according to the present invention communicates by the time division connection method, and comprises a control portion for synchronizing its transmission/reception timing to that of a group including a plurality of radio terminals, wherein said control portion:

determines the overall cycle including basic cycles in a number corresponding to the number of said radio terminals within said group;

conducts control to transmit a signal in a basic cycle that is included in said overall cycle and that is set by a unique terminal number allotted in advance to each of said radio terminals;

conducts control to receive signals from another radio terminal in another basic cycle;

adjusts the transmission/reception timing based on the data received from said other radio terminal in said other basic cycle; and saves the reception timing until a process to adjust the transmission/reception timing is conducted.

Preferably, said control portion conducts a scan operation for detecting other terminals when entering a communication system formed of a plurality of radio terminals within said group, receives signals from another radio terminal in a predetermined basic cycle, and synchronizes its own intermittent operation to the timing detected from the received signal.

Preferably, when any of the radio terminals within said group leaves the communication system, said control portion saves the reception timing up to that time including the basic cycle transmitted by such leaving terminal.

Preferably, said control portion conducts a scan operation for detecting other terminals in a pre-set cycle, and when said control portion detects a group that conducts intermittent operation in a timing different from its own terminal, said control portion compares the number of radio terminals within said group with the number of terminals within the group with which it has established synchronization, and then corrects the timing of its own terminal to the timing of the group with the larger number of radio terminals.

Preferably, when as result of comparison between the number of radio terminals within said group and the number of terminals within the group with which it has established synchronization, the number of radio terminals is the same, said control portion corrects the timing of its own terminal to the timing of the group that includes the radio terminal with the smallest terminal number.

Preferably, said control portion prepares a sequence number, attaches said sequence number to a plurality of packets, and conducts control to transmit said packets at a predetermined timing within said basic cycle for transmission, when said control portion receives at least one of said plurality of packets with the sequence number attached thereto from another radio terminal, said control portion calculates the adjustment period based on the sequence number of the received packet, and said control portion sets the timing of the transmission and reception cycle based on said adjustment period.

Preferably, assuming the number of packets to be transmitted is n, the packet time is B, and the preset adjustment period is C, when the packet received from another radio terminal is the kth packet, said adjustment period becomes B*(n−k)+C, and after packet reception has ended and said adjustment period has passed, the intermittence period starts.

Preferably, when none of said plurality of packets are received, the reception timing up to that time is saved.

Preferably, at the intermittent operation during standby, said control portion adds, in addition to its own terminal number, information on the terminal numbers of the other terminals synchronized with its own terminal to the transmission data, transmits such data, and synchronizes the timing of its own terminal to that of said other terminals based on the received information on the terminal numbers of said other terminals.

Preferably, said terminal compares the directly received terminal number information with indirectly acquired terminal number information on said other terminals to determine radio terminals outside of its own communication region, and, based on the result, synchronizes its own timing to that of said other terminals.

The radio synchronization system according to the present invention comprises a plurality, of radio terminals communicating by the time division connection method and comprising a control portion for synchronizing its transmission/reception timing to that of a group including a plurality of radio terminals, wherein said control portion determines the overall cycle including basic cycles in a number corresponding to the number of said radio terminals within said group, conducts control to transmit a signal in a basic cycle that is included in said overall cycle and that is set by a unique terminal number allotted in advance to each of said radio terminals, conducts control to receive signals from another radio terminal in another basic cycle, adjusts the transmission/reception timing based on the data received from said other radio terminal in said other basic cycle, and saves the reception timing until a process to adjust the transmission/reception timing is conducted, wherein said plurality of radio terminals form one group, each of said radio terminals is allotted a unique terminal number, and said plurality of radio terminals successively operate as transmitter terminals according to their own identification information during said overall cycle.

The overall cycle may include an emergency channel that can be used by an arbitrary radio terminal for communication.

The medium according to the present invention records a program for causing a computer included in a radio terminal communicating by the time division connection method to function as a control portion that causes said radio terminal to synchronize its transmission/reception timing to that of a group including a plurality of radio terminals, said program causing a computer to implement the steps of:

determining the overall cycle including basic cycles in a number corresponding to the number of said radio terminals within said group;

transmitting data in a basic cycle included in said overall cycle as set by a unique terminal number allotted in advance to each of said radio terminals;

receiving signals from another radio terminal in another basic cycle;

adjusting the transmission/reception timing based on the data received from other radio terminal in said other basic cycle; and saving the reception timing until a process to adjust the timing is conducted.

Medium includes flexible disks, hard disks, magnetic tapes, magneto-optical disks, CDs (including CD-ROM, Video-CD), DVDs (including DVD-Video, DVD-ROM, DVD-RAM), ROM cartridges, RAM memory cartridges with battery backup, flash memory cartridges, nonvolatile RAM cartridges, etc.

Also included are communications media such as cable communications media (e.g., telephone lines), and wireless communications media (e.g., microwave circuits).

Medium is defined as any kind of physical means for storing information (mainly digital data, programs), used for causing computers, dedicated processors and other processing apparatuses to perform certain functions. In other words, this may be any means for downloading programs onto a computer and for causing the computer to implement certain functions.

BRIEF DESCRIPTION OF THE DRAWINGS

FIG. 7 is a view explaining the scan operation according to an embodiment of the present invention; and FIG. 8 is an explanatory view of the frame structure of the data transmitted during the intermittent operation according to an embodiment of the present invention.

DESCRIPTION OF THE PREFERRED EMBODIMENTS

Now, the device/system according to an embodiment of the present invention will be described with reference to the drawings.

Figure 1:
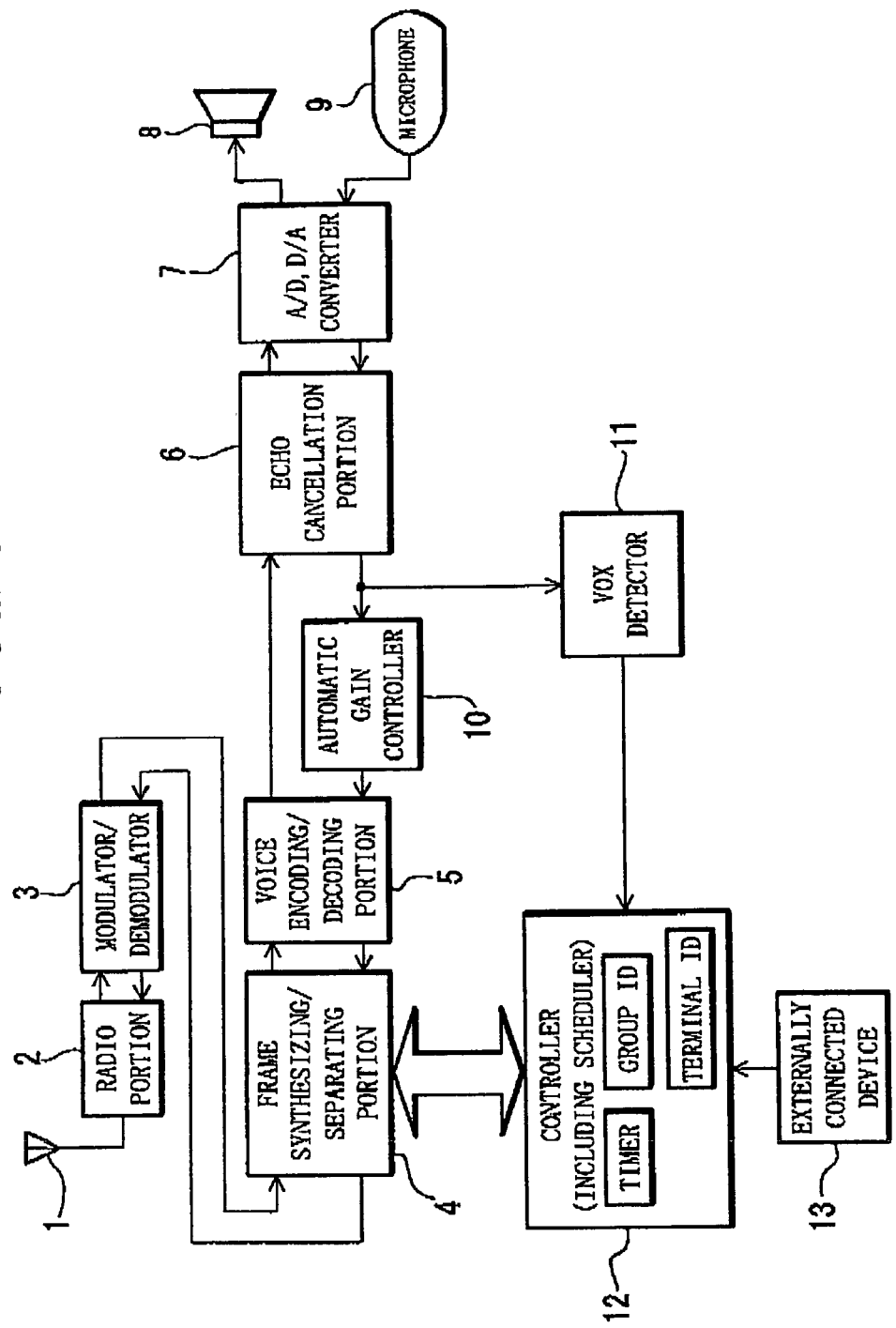
FIG. 1 is a block view of the radio terminal according to an embodiment of the present invention.

FIG. 1 is a block view of the radio terminal according to an embodiment of the present invention. This radio terminal (e.g., a digital transceiver) comprises an antenna 1, a radio (high frequency) portion 2 connected to antenna 1, a modulator/demodulator 3, a frame synthesizing/separating portion 4, a voice encoding/decoding portion 5, an echo cancellation portion 6, an A/D-D/A converter 7, a speaker 8, a microphone 9, an automatic gain controller 10, a VOX detector 11, and a controller 12. Controller 12 is connected with an externally connected device 13 (e.g., a personal computer or a GPS device). Externally connected device 13 can communicate with other radio terminals via controller 12. Controller 12 implements the following processing in order to establish synchronization. Controller 12 stores a group ID and a terminal ID (both to be described later in detail), and includes a synchronization establishment timer. Now, a controller realized by a processor (computer) that includes a program for the following process will be described below.

Figure 2:
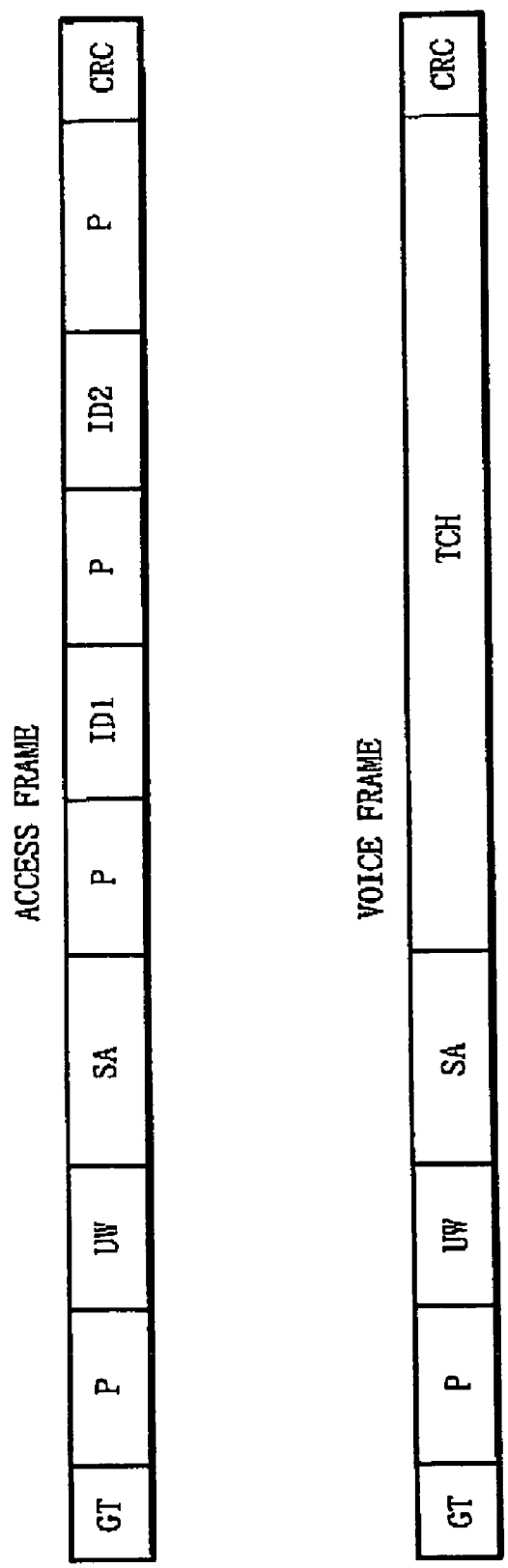
FIG. 2 shows an example of the frame format of the radio terminal according to an embodiment of the present invention.

FIG. 2 shows an example of the frame format of the present radio terminal. "Access Frame" is the synchronization pull-in frame of a lower layer (frame separation/synthesis portion). The access frame is formed of a guard time (GT), a preamble (P), a unique word (UW), a slow access control channel (SA), an MSB ID (ID1), an LSB ID (ID2), and a CRC check bit (CRC). "Voice Frame" is the voice data frame of a lower layer (frame separating/synthesizing portion). The voice frame is formed of a guard time (GT), a preamble (P), a unique word (UW), a slow access control channel (SA), voice data (TCH), and a CRC check bit (CRC). Here, SA is a packet for information communication of data other than voice data between two microprocessors included in control portion 12. ID1 is the top half of the group ID on the MSB side set by the microprocessors. When the group IDs are different, no frame synchronization is established. ID2 is the lower half of the group ID on the LSB side set by the microprocessors. The IDs are received and identified at a lower layer. Higher layer information such as the channel and terminal ID are communicated by the SA, and voice data are communicated by the TCH.

The digital radio communication system according to an embodiment of the present invention permits information sharing among a specific group having a plurality of the radio terminals according to an embodiment of the present invention, and provides, at the same time, broadcasting and privacy functions.

Figure 4:
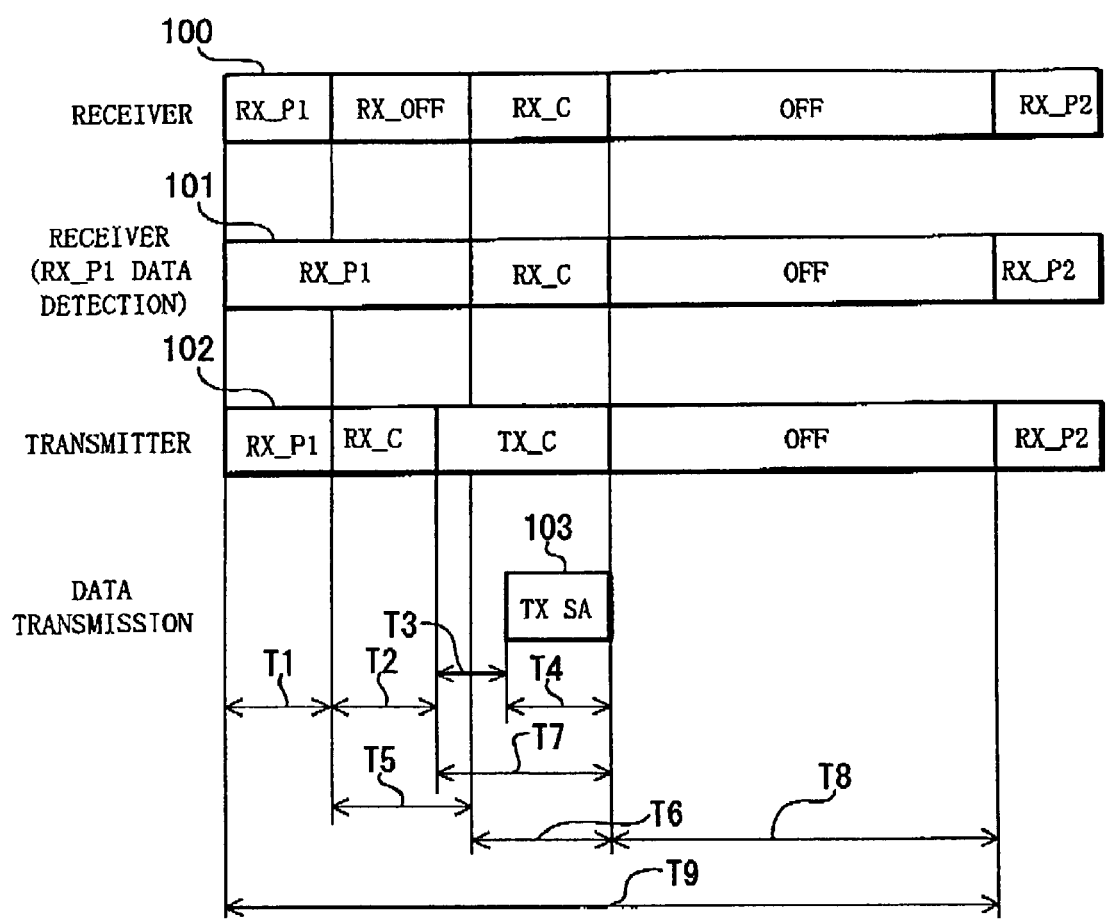
FIG. 4 is a detailed view of the basic cycle according to an embodiment of the present invention.

According to the present system, a number of the radio terminals shown in FIG. 4 are defined as one group, and a unique ID (group ID) is allotted to each group. Each of the radio terminals within the group also holds a unique ID (terminal ID). Each radio terminal successively implements intermittent reception during its waiting period, thereby sharing information on terminals within its group without requiring a base station.

The channels used in the embodiment of the present invention are implemented by arbitrarily allotting the several radio channels to a one-way communication channel, a two-way communication channel, and a channel for communication between different groups.

The one-way communication channel (common channel) is a channel for simplex communication such as a by an analog transceiver, and is selected manually by the user.

The two-way communication channel (conversation channel) is a channel for duplex communication such as by a telephone. The microprocessor monitors the state of use of the channels during standby, and, each time, selects a channel that has no interference. Specifically, it selects the channel with least interference among the selectable channels, based on the used terminal and the used channel information that are known through intermittent reception within the group, and based on RSSI, etc., regarding any disturbances from other groups and other radio systems.

The channel for communication between different groups is a fixed channel that is common to all terminals for simplex communication with terminals in other groups.

Furthermore, data communication is also possible. In this case, the channel is selected based on the destination of the data communication in the same way as for conversation.

Now, the specific processing procedures according to an embodiment of the present invention will be described with reference to the drawings.

When all stations are mobile radio terminals (e.g., a plural number of specific digital transceivers), the connectable terminals differ every moment due to battery shortage, or according to the communication environment. AS it is difficult to set a fixed base station, it is necessary for all terminals to transmit heartbeat in order to synchronize with the system. This means that when synchronization has been established, all terminals successively function as the base station.

Figure 3:
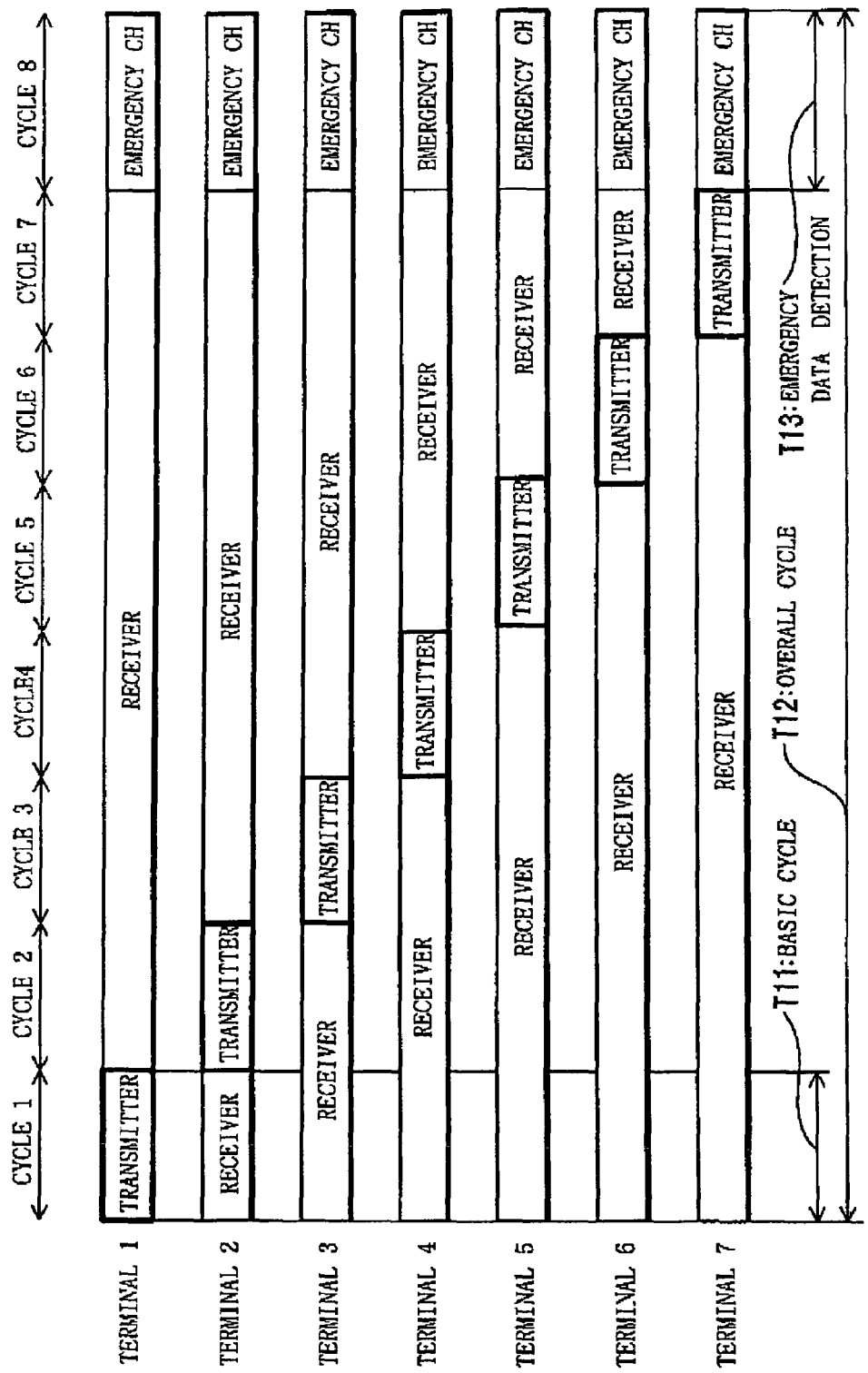
FIG. 3 is an overall view of the transmitting/receiving cycle according to an embodiment of the present invention.

FIG. 3 is a timing chart showing the reception cycle when there are seven radio terminals in the system according to an embodiment of the present invention. Each radio terminal has a pre-allotted number (terminal ID). In FIG. 3, terminals 1-7 successively function as transmitter terminals. In other words, in cycle 1, terminal 1 functions as the transmitter, in succeeding cycle 2, terminal 2 functions as the transmitter, and terminals 3–7 function as transmitters in the same way. When a terminal does not function as a transmitter, it functions as a receiver. After the transmission by terminal 7, an emergency channel T12 is provided in cycle 8. Emergency channel T12 provides time for data detection and reception in an emergency. In emergency channel T12, any arbitrary terminal can function as the transmitter.

Each cycle forms a cycle unit (basic cycle T11). Basic cycle T11 is the basic cycle between all terminals in the present system. Cycles 1–8 form the overall cycle T13 in the group of terminals 1–7.

During the cycle in which a terminal functions as the receiver terminal, it receives data from another terminal (transmitter terminal), and after it has finished receiving the data, it adjusts its reception cycle.

In FIG. 3, a timer controls the reception cycle, so the reception timing is not cancelled until a process is carried out to change the timing. For example, even when voice communication control is performed, at the end of the voice communication, reception operation is carried out at a reception timing that comes after the time period required for voice communication control. How the reception timing is changed will be described later.

FIG. 4 shows the transmission and reception cycle of each terminal during the basic cycle in FIG. 3. The timing chart of the receiver terminal is denoted by numerals 100, 101, and that of the transmitter terminal by numeral 102. The reference data for cycle adjustment is denoted by numeral 103.

T1 is the period for data detection in the conversation channel (P ch). During this period, all terminals on standby are receivers, having only the sense of a carrier of the terminal for which an event has occurred. The conversation channel is a duplex channel, used only for one-to-one (duplex) conversation by setting the channel at an upper level. This channel provides upper layer information. During this period, a terminal for which an event has occurred and that requires duplex access transmits P ch data, a receiver terminal receives such data, the terminal to be accessed enters the event sequence, and the other terminals return to the standby state.

T2 is the period in which a transmitter terminal detects data in the common channel (C ch). The common channel is a simplex channel, used only for one-to-n (simplex) conversation by setting the channel at an upper level. This channel provides upper layer information. When data is detected in this channel, the event sequence is entered, so the intermittent transmission at T7 is not implemented. This is to avoid collision with the terminal for which an event has occurred and that requires simplex access.

T3 is a period that is provided to ensure that during the intermittent transmission by a transmitter in the common channel, reference data 103 is not sent until a receiver detects data. This period is provided in consideration of the time for establishment from the frame synchronization (which actually varies), thereby delaying data transmission.

T4 is a period in which a transmitter transmits reference data in the common channel.

T5 is the OFF/Conversation channel reception period of the receiver. When data is detected during P ch scan in T1, data is received (101 in FIG. 4), and when no data is detected, the receiver goes OFF (100 in FIG. 4).

T6 is a period in which a receiver receives data in the common channel and adjusts its synchronization. T6 is set to allow inclusion of data detection time and data reception time.

T7 is a period in which a transmitter transmits data in the common channel. T7 is set to the time from when the receiver detects data until it is ready to receive data.

T8 is the intermittence period of the system.

T9 is one cycle (basic cycle) of a standby sequence including T1–T8

At the initial synchronization in FIG. 3, all terminals repeat transmission and reception at their own timing, so there is a possibility of collision. In order to avoid this, when one terminal has transmitted data at a certain time, another station that receives such signal corrects its own timing based on the terminal data included in the received data (T7, T4 and T6 described above). The specific procedures of setting the reception timing will be described later in detail.

Now, the operation by a radio terminal at activation will be described below. During activation, the radio terminal conducts a scan operation. This scan operation is shown in FIG. 7. The microprocessor of the radio terminal receives the scan operation event, switches the RX OFF period in the "basic cycle" to RX_C(Common Channel) reception, and enters the scan operation. In this scan operation, the RX_C period is longer than usual (middle of top part in FIG. 7). The scan operation is cancelled by the "reception synchronization adjustment" function. Regardless of whether during the scan operation, the TX_C operation is carried out. The other terminals repeat their usual operation (bottom part in FIG. 7), and the radio terminal that is during the scan operation synchronizes itself to this reception cycle. In other words, during period T5 in FIG. 4, the radio terminal receives data in C-ch, then, during period T7, it detects intermittently transmitted data 103 of other terminals with which it has not established synchronization. After detection, the radio terminal synchronizes its own intermittent operation to the detected timing. Basically the same operation as for activation is conducted for the entry of a terminal in the system.

Next, the operation of a terminal leaving the system of a plurality of radio terminals will be described below. In this case, the overall system cycle shown in FIG. 3 is also maintained. For example, even if radio terminal #1 leaves the system, the intermittent operation of the other terminals with which #1 has established synchronization does not change. Different is only that the other terminals cannot receive data at the intermittent transmission timing of radio terminal #1.

Now, the error recovery operation will be explained. A terminal that has established synchronization with the other terminals (normal operation state) also conducts scan operation in order to detect the other terminals in set cycles. The aim is to establish system synchronization. When, as result of the scan operation, a terminal group is detected that conducts intermittent operation at a timing different from itself, it conducts a comparison of the number of terminals with which it has established synchronization (including terminals indirectly synchronized in T4), and corrects the timing to that of the group with the larger number of terminals. If the number of terminals is the same, it corrects its timing to that of the group including the terminal with the smallest terminal number. As the present system does not hold a fixed reference station, there is a possibility that two or more groups (sub-groups) will be made even when the radio terminals are mutually within their communication areas. The error recovery operation is a procedure to avoid this. The error recovery operation puts the sub-groups to the original group together, enabling arbitrary radio terminals within the group to communicate with each other.

Through the operation described above, it is possible to gather two or more groups that have divided from one system to one group again.

Now, the sequence of changing the reception timing will be described below

Figure 5:
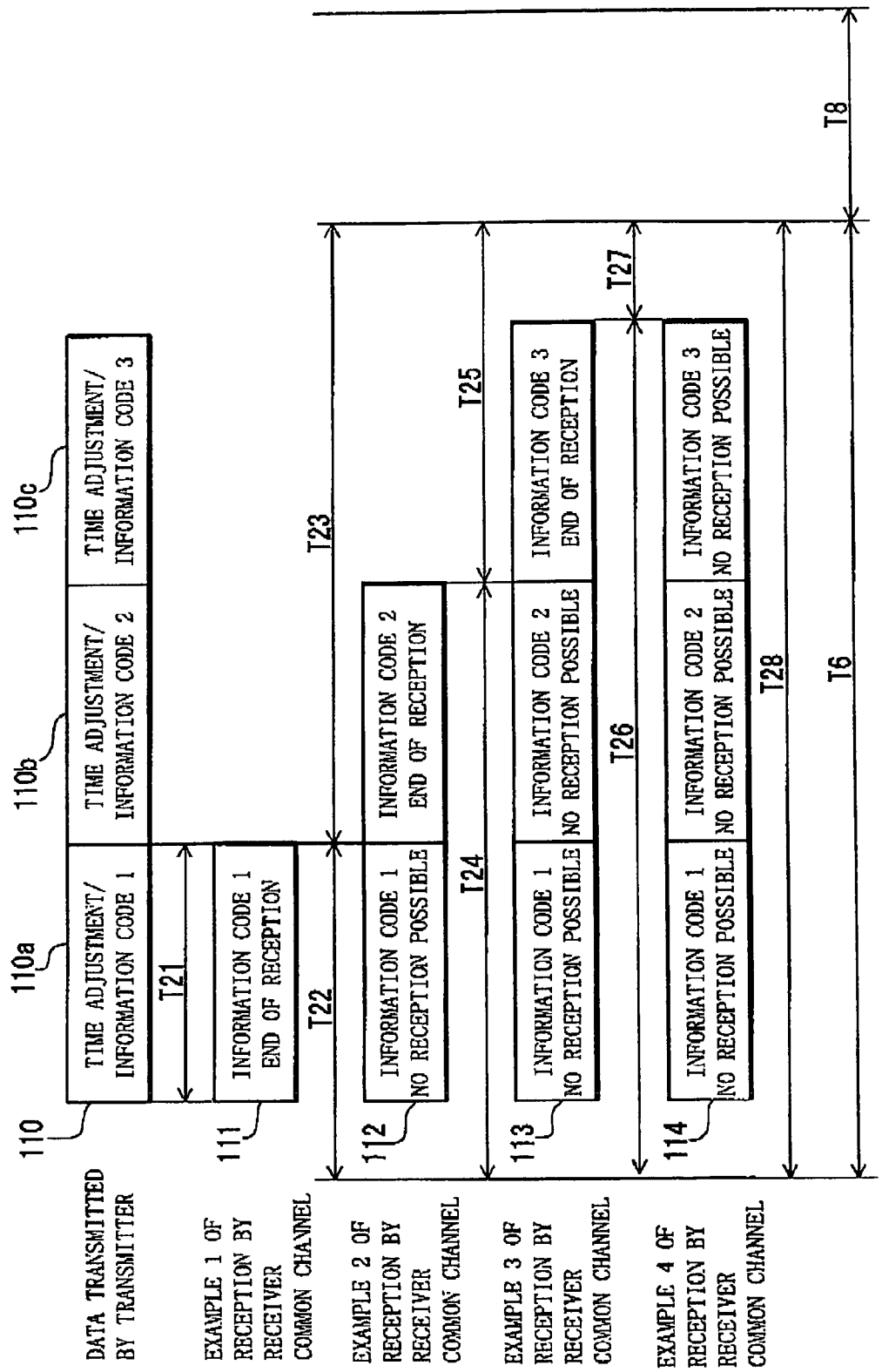
FIG. 5 is a detailed view of the reception cycle adjustment according to an embodiment of the present invention.

Even after establishment of system synchronization, a radio terminal constantly corrects its timing based on periodically received signals from each terminal FIG. 5 is a timing chart explaining the reception synchronization adjustment.

The transmitter terminal transmits three packets during T4, the period for transmitting reference data in the common channel (numeral 110). Here, the packets are allocated sequence numbers and transmitted. The sequence number is decided by setting three types (Nos. 1–3) of command codes in the transmission data frame at intermittent operation (upper frame) as shown in FIG. 8. In FIG. 8, a command code is the header indicating what information the data from the second byte onward holds, and differs by command type ("frame" as referred to in FIG. 8 is the frame used by the microprocessor, and does not mean the radio transmission frame). Group data means information on terminals synchronized to its own intermittence timing. Through the operation described above, the transmitter terminal conveys the timing information to the module (scheduler) that conducts timing control of the radio terminal. Thereafter, the transmitter terminal number is attached to the packet data and transmitted. The period T21 of one packet is B sec.

Numeral 111 denotes a case where the packet of sequence number 1 is received at reception period T22. In this case, adjustment period (OFF) T23 becomes B*2+C sec, and after adjustment period T23 that starts after reception period T22 has passed, intermittence period T8 starts. C is a predetermined adjustment period (OFF).

Numeral 112 denotes a case where not the packet of sequence number 1, but the packet of sequence number 2 was received at reception period T24. In this case, adjustment period T25 becomes B*1+C sec, and after adjustment period T25 has passed, the intermittence period (T8) starts.

Numeral 113 denotes a case where the packets of sequence number 1 and 2 were not received at reception period T24, but the packet of sequence number 3 was received. In this case, adjustment period T27 becomes C sec, and after adjustment period T27 has passed, the intermittence period T8 starts.

Numeral 114 denotes a case where none of the packet data was received during reception period T26. In this case, after reception period T28(=T6) has passed, intermittence period T8 starts. Reception period T28 is set in advance to A sec.

Based on the transmitter terminal number attached to the transmitted packet data it has received, the receiver terminal sets the timing of the transmission cycle or the reception cycle in FIG. 3. The receiver thereby adjusts its timing of becoming a transmitter, and the sequence shown in FIG. 3 is generated, or maintained.

As described above, according to the embodiments of the present invention, the reference data is constantly renewed based on data from each terminal without setting a fixed base station, so synchronization is maintained in a stable manner regardless of any increase or decrease in the number of stations. Furthermore, efficient intermittent operation is possible through the synchronization system, extending the battery life of terminals on standby. This point is also effective in transmitting and receiving positional data (such as GPS data), which periodically require renewal, between terminals.

Also, if any of the terminals are connected to a personal computer, or have a GPS device mounted thereon, it is possible to share Internet information and positional data of such terminal within the group. In this case, there is no need to connect to a public network.

The embodiments of the present invention have the following features.

As each terminal successively becomes the base station, the embodiment of the present invention is a network that does not hold a fixed base station. In the prior art, although there is no direct synchronization control from a fixed station, the timing is detected from terminals participating in the network, thereby indirectly using the timing from a fixed station.

According to the embodiments of the present invention, a terminal detects the fixed timing allotted to the other terminals and conducts synchronization. In the prior art, a terminal determines its access timing by searching for an open slot.

Figure 6:
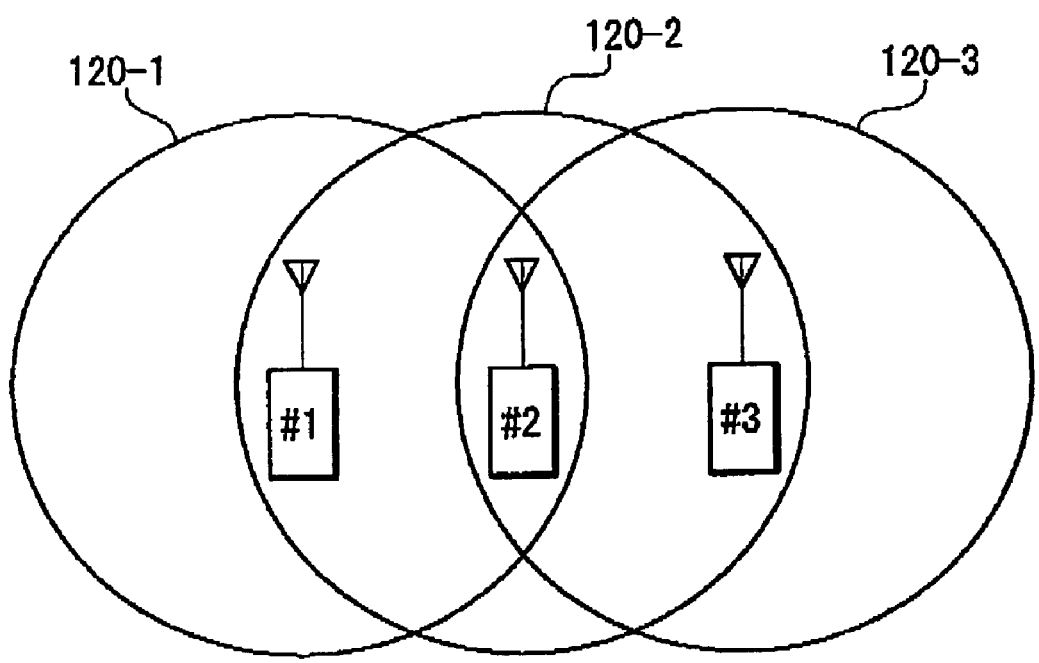
FIG. 6 is a view explaining the synchronization establishment of the telecommunications system according to an embodiment of the present invention.

According to the embodiments of the present invention, at the intermittent operation during system standby, it is possible for each terminal to add the number of the other terminals synchronized with it to the transmission data in addition to its own terminal number (FIG. 8). Thereby, even when all terminals cannot mutually communicate as in FIG. 6, data communication between terminals #1 and #2, and between terminals #2 and #3 is possible. In FIG. 6, numerals 120-1 to 120-3 denote the areas covered by terminals #1 to #3 (communication regions).

When system synchronization is established in the state shown in FIG. 6, terminals #1 to #3 on standby refer to the group data that shows the transmission data frame structure during intermittence as shown in FIG. 8 from within the data received through intermittent reception, and thereby learn the state of its own terminal and of the terminals that have established synchronization with the system (quasi-synchronization).

For example, the timing when #1 and #3 receive the transmission data of #2 is approximately the same as shown in FIG. 3, and #1 learns from the received data that #3 exists in the same group (and the same applies to #3). However, as #1 cannot directly receive the transmission data of #3, the information on the directly accessed terminals through intermittent reception and on the group data from the intermittent reception data are different. By comparing these data, it is possible to learn of terminals within the same group that are outside of its own communication region.

Through the above procedure, terminals #1 and #3 that cannot directly communicate with each other can learn indirectly that synchronization is established.

The radio system formed of the radio terminals according to the embodiments of the present invention offer the following advantageous effects:
- voice and data communication with a specific terminal within the group is possible;
- voice and data communication with all terminals within the group is possible;
- the voice communication state of other members within the group can be confirmed; and
- when receiving a call, the transmitter can be confirmed.

The present invention is not limited to the above embodiments; variations are possible within the scope of the claims, which are incorporated in the scope of the present invention.

Furthermore, means as used herein does not necessarily mean physical means, but includes cases where the function of the means is realized through software. The function of a single means may be realized through two or more physical means, and vice versa.

What is claimed is:

1. A radio terminal communicating by the time division connection method, comprising a control portion for synchronizing its transmission/reception timing to that of a group including a plurality of radio terminals, wherein said control portion:
- determines the overall cycle including basic cycles in a number corresponding to the number of said radio terminals within said group;
- conducts control to transmit a signal in a basic cycle that is included in said overall cycle and that is set by a unique terminal number allotted in advance to each of said radio terminals;
- conducts control to receive signals from another radio terminal in another basic cycle;
- adjusts the transmission/reception timing based on the data received from said other radio terminal in said other basic cycle;
- saves the reception timing until a process to adjust the transmission/reception timing is conducted;
- prepares a sequence number, attaches said sequence number to a plurality of packets, and conducts control to transmit said packets at a predetermined timing within said basic cycle for transmission;
- when said control portion receives at least one of said plurality of packets with the sequence number attached thereto from another radio terminal, said control portion calculates the adjustment period based on the sequence number of the received packet; and
- said control portion sets the timing of the transmission and reception cycle based on said adjustment period,
- wherein, when the number of packets to be transmitted is n, the packet time is B, and the preset adjustment period is C, when the packet received from another radio terminal is the kth packet, said adjustment period becomes $B*(n-k)+C$, and after packet reception had ended and said adjustment period has passed, the intermittence period starts.

* * * * *